June 6, 1944. A. W. NELSON 2,350,412
RETICULATED METAL WALKWAY AND METHOD OF PRODUCING SAME
Filed Sept. 4, 1941
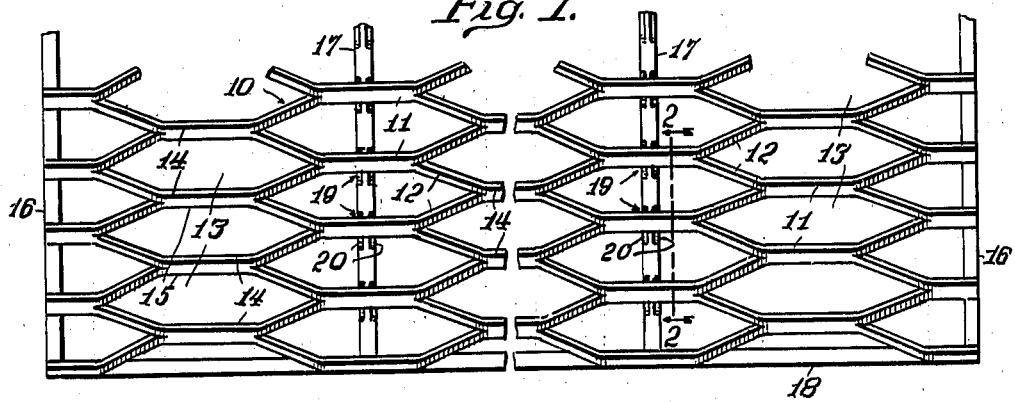
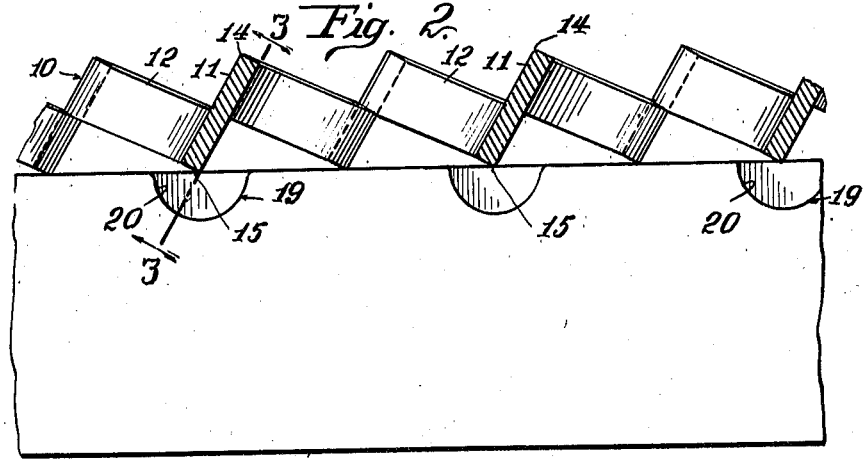
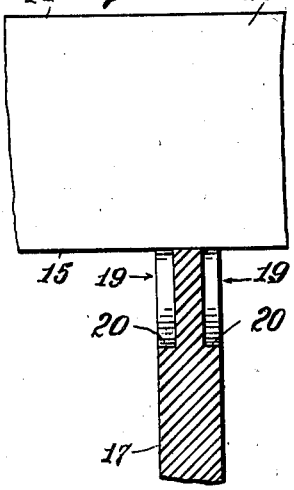
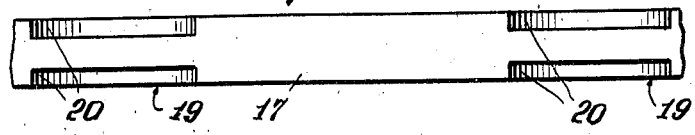
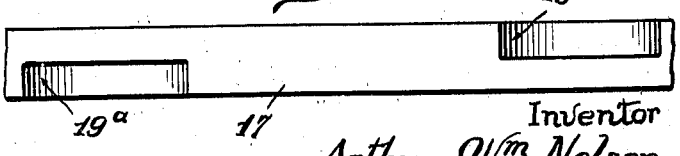
Inventor
Arthur Wm Nelson
By Ponis H. Alfreds
Attorney Patented June 6, 1944

2,350,412

UNITED STATES PATENT OFFICE 2,350,412

RETICULATED METAL WALKWAY AND METHOD OF PRODUCING SAME

Arthur W. Nelson, Park Ridge, Ill., assignor to Apex Railway Products Co., Chicago, Ill., a corporation of Delaware Application September 4, 1941, Serial No. 409,447

9 Claims. (Cl. 189—82)

This invention relates to improvements in reticulated metal walkways and method of producing same and it consists of the matters hereinafter described and more particularly pointed out in the appended claims. The invention is more especially concerned with anti-skid metallic walkways. One type of walkway for which the invention is particularly adapted is as a safety running board on a freight car and which includes an open work metal tread panel of rectangularly shaped, connected units that have marginal parts welded to edge portions of suitable supporting bars.

An example of the kind of panel above mentioned, is one made of expanded metal. The expanded metal panel is made from a sheet that is thinner than the bars of the frame. It includes integral strands and bonds having edgewise parts disposed other than perpendicular to the plane of the panel as a whole. Edge parts of certain of the bond portions are resistance welded to edge parts of the associated supporting bars. As the bars are thicker than the bond portions of the panel, the resistance welding operation tends to burn the bond portions so that in some instances a crumbling of the metal of the bond portions occurs, which results in an unsatisfactory walkway.

One of the objects of the invention is to provide a walkway of the kind mentioned wherein it is possible to resistance weld certain of the bonds of the expanded metal panel to the relatively thicker supporting bars without the danger of burning the bonds whereby crumbling is avoided.

Another object of the invention is to provide a walkway of the kind mentioned wherein the supporting bars, which are thicker than the metal of the bonds of the panel, are so formed that said bonds may be resistance welded thereto without the danger of burning.

Also, it is an object of the invention to provide the supporting bars of the walkway with parts of substantially the same thickness as the metal of the panel so that the burning action during the resistance welding is avoided.

Furthermore, it is an object of the invention to provide in a walkway of this kind, supporting bars for the panel having certain parts of one of its edge portions thinner than other parts thereof, so that during a resistance welding operation, the panel is secured to the bars without burning the bond portions thereof, whereby a good, clean weld results.

Also, it is an object of the invention to provide an improved method of making a walkway of this kind whereby burning of parts of the panel is avoided when the panel is being resistance welded to the thicker bars of the frame.

The above mentioned objects of the invention, as well as others, together with the advantages thereof will more fully appear as the specification proceeds.

In the drawing:

Fig. 1 is a top plan view of a fragment of a walkway embodying the preferred form of the invention.

Fig. 2 is a detail longitudinal vertical sectional view through a part of the walkway, on an enlarged scale, as taken on the line 2—2 of Fig. 1.

Fig. 3 is a detail transverse vertical sectional view, on a scale enlarged over that of Fig. 2, through another part of the walkway, as taken on the line 3—3 of Fig. 2.

Fig. 4 is a top plan view of a fragment of one of the supporting bars of the frame of the walkway, on the scale of Fig. 3.

Fig. 5 is a top plan view of a fragment of a modified form of supporting bar which may be advantageously employed in the frame of the walkway.

Referring now in detail to that embodiment of the invention illustrated in the accompanying drawing, 10 indicates as a whole, the reticulated panel of the improved walkway which in this instance is shown as composed of a piece of expanded metal. Said expanded metal panel includes bond portions 11 and strand portions 12 integrally connected thereto to provide substantially elongated hexagonally shaped openings 13 as in Fig. 1. The bond portions and the strand portions are disposed edgewise and inclined to a plane perpendicular to the plane of the panel as a whole. The bond portions are twice the width of the strand portions and due to their angular disposition in the panel, diametrically opposite sectional corner edge portions 14 and 15 respectively, of said bond portions, define the so-called thickness of the panel. Said corner edge portions provide an anti-slip tread surface for either side of the panel.

The panel above described is attached, as will later appear, to an open supporting frame which includes side and intermediate members 16 and 17 respectively. These members are welded at their ends to the end members 18 of the frame, only one of which appears in Fig. 1. The side and intermediate members 16 and 17 extend in a direction at a right angle to that of the bonds 11 of the expanded metal panel, while the end members 18 of the frame extend in a direction parallel with said bonds.

The side, intermediate and end members 16, 17 and 18 respectively, of the supporting frame, are shown as in the form of flat bars which are wider than they are thick. Said bars are disposed edgewise and perpendicular to the plane of the panel as a whole. The bars constituting the frame are made of stock considerably thicker than the thickness of the metal of which the bonds and strands of the panel are formed.

As here shown, each side and intermediate bar 16 and 17 is formed at longitudinally spaced points 19 so as to there be of a thickness approximating that of the bonds and strands of the panel. The spacing between said portions 19 approximates the spacing between the bond portions of the panel in a direction at a right angle thereto. In Figs. 2, 3 and 4, I have shown said portions as being formed by depressing opposite sides thereof to produce recesses 20 therein so that said portions 19 are disposed in planes between the opposite sides of the bar. In Fig. 5 I have shown a similar portion 19a formed by depressing only one side of the bar. As the bond portions 11 in one row are disposed or offset intermediate bond portions in adjacent rows thereof, the portions 19 in one bar 16 or 17 are offset with respect to those in the adjacent bars.

The panel 10 is attached to the bars 16 and 17 by resistance welding. After said bars 16, 17 and 18 are welded together to provide the open supporting frame, a panel 10 is placed upon the frame and the bottom edge part of each bond portion of the panel will engage upon the thinner portions 19 of said bars. The frame and panel thus assembled, are placed in a resistance welding machine. In the welding operation of the machine, the panel and the frame are moved toward each other under pressure. As the welding operation continues, the bond portions are pressed firmly into the bar portions 19 and as the thickness thereof approximates that of the metal of which the panel is formed, the parts fuse together without a tendency to burn. Therefore, a good, clean weld is afforded.

The recess structures in the bars do not remove any appreciable strength from the bar. With the arrangement called for, the welds connecting the bond portions to the bars are more uniform and clean in appearance and there is no burned portion to crumble or give away.

While in describing the invention, I have referred in detail to the form, arrangement and construction of the parts involved, the same is to be considered only in the illustrative sense so that I do not wish to be limited thereto except as may be specifically set forth in the appended claims.

I claim as my invention:

1. A walkway embodying therein an open work tread panel that includes a plurality of spaced relatively thin sheet metal parts, laterally spaced relatively thick metal bars having edge portions to which said panel is secured for support, longitudinally spaced parts of said edge portions being thinner than other and thicker parts of said edge portions therebetween, at least certain of said spaced relatively thin sheet metal parts having a welded edge to edge engagement with said thinner longitudinally spaced parts of said bars.

2. A walkway embodying therein an open work tread panel that includes a plurality of spaced relatively thin sheet metal parts, laterally spaced relatively thick metal bars having edge portions to which said panel is secured for support, longitudinally spaced parts of said edge portions being thicker than other and thinner edge portions therebetween and which thin edge portions are substantially of the same thickness as said thin sheet metal parts, certain ones of said thin sheet metal parts having a welded edge to edge engagement with said thinner edge portions of said bars.

3. A walkway embodying therein an open work tread panel that includes a plurality of spaced relatively thin sheet metal parts disposed edgewise at an inclination to the plane of the panel as a whole, laterally spaced relatively thick metal bars having edge portions to which said panel is secured for support, longitudinally spaced parts of said edge portions being thinner than other and thicker parts of said edge portions therebetween, at least certain of said spaced relatively thin sheet metal parts having a welded edge to edge engagement with said thinner longitudinally spaced parts of said bars.

4. A walkway embodying therein an expanded metal panel having a plurality of integrally connected bond portions and strand portions, the edgewise planes of which are inclined to the plane of the panel as a whole, and laterally spaced metallic bars for supporting said panel, said bars being thicker than said bond and strand portions of said panel, longitudinally spaced parts of the edge portions of said bars being thicker than other and thinner edge portions therebetween and which thin edge portions are substantially of the same thickness as said bond and strand portions, certain ones of said bond portions having a welded edge to edge engagement with said thinner edge portions of said bars.

5. A walkway embodying therein an expanded metal panel having a plurality of integrally connected bond portions and strand portions, the edgewise planes of which are inclined to the plane of the panel as a whole, and laterally spaced metallic bars for supporting said panel, said bars being thicker than said bond and strand portions of said panel, longitudinal spaced parts of one edge portion of said bars having recesses in at least one side thereof so as to define parts which are thinner than other parts therebetween along the edge thereof and to which thinner parts certain of said bond portions are engaged and welded for support.

6. The method of making a reticulated metal walkway structure which consists in providing a frame including bars having spaced edge portions thereof made thinner than other edge portions therebetween, in providing a reticulated metal tread panel having edgewise portions inclined to the plane of the panel as a whole, assembling said panel upon said bars so that certain of said edgewise portions of the panel are engaged with said thinner portions of said bars and then resistance welding said certain of said edgewise portions of the panel to said thinner portions of said bars.

7. A walkway embodying therein a tread panel of expanded metal having relatively thin strand and bond portions with the bond portions arranged in rows extending in one direction of the panel, the top and bottom edges of said bond portions forming the effective top and bottom surfaces of the panel, and edgewise supporting bars for the panel and associated with the bottom surface thereof and disposed in the plane of at least certain of the rows of bond portions, said bars being thicker than said bond portions and each having thinner parts in its upper edge separated by thicker parts therebetween in said upper edge and spaced to accord with the bond portions in the associated row and which thinner parts are engaged by and are welded to the lower edge parts of the bond portions in said associated row.

8. A walkway embodying therein a tread panel of expanded metal having relatively thin strand and bond portions with the bond portions arranged in rows extending in one direction of the panel, the top and bottom edges of said bond portions forming the effective top and bottom surfaces of the panel, and edgewise supporting bars for the panel and associated with the bottom surface thereof and disposed in the plane of at least certain of the rows of bond portions, said bars being thicker than said bond portions and each having parts in its upper edge spaced to accord with and substantially of the same thickness as said bond portions in the associated row and separated by thicker parts in said edge portions and which first mentioned parts of said upper edge are engaged by and are welded to the bond portions in the associated row.

9. A walkway embodying therein a tread panel of expanded metal having relatively thin strand and bond portions with the bond portions arranged in rows extending in one direction of the panel, the bond portions having lower flat edge surfaces disposed in planes inclined to the plane of the panel and having side surfaces perpendicular to said edge surfaces, and metallic bars of a thickness greater than that of said strand and bond portions disposed in the plane of at least certain of said rows of bond portions and to one edge portion of which the panel is secured for support, said edge portions of said bars being formed with alternate thinner parts and intermediate thicker parts and which thinner parts are so spaced as to be engaged by certain rows of bond portions and which are welded thereto.

ARTHUR WM. NELSON.